United States Patent
Kawaguchi et al.

(10) Patent No.: US 12,025,938 B2
(45) Date of Patent: Jul. 2, 2024

(54) INFORMATION PROCESSING APPARATUS, METHOD OF CONTROLLING INFORMATION PROCESSING APPARATUS, AND IMAGE FORMING APPARATUS

(71) Applicant: CANON KABUSHIKI KAISHA, Tokyo (JP)

(72) Inventors: Daisuke Kawaguchi, Kashiwa (JP); Jiro Shirakata, Chigasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/846,356

(22) Filed: Jun. 22, 2022

(65) Prior Publication Data

US 2022/0317615 A1 Oct. 6, 2022

Related U.S. Application Data

(63) Continuation of application No. 17/123,475, filed on Dec. 16, 2020, now Pat. No. 11,392,069, which is a
(Continued)

(30) Foreign Application Priority Data

Jan. 30, 2018 (JP) ................................ 2018-014119

(51) Int. Cl.
*G03G 15/00* (2006.01)
*G06Q 10/0875* (2023.01)

(52) U.S. Cl.
CPC ......... *G03G 15/556* (2013.01); *G03G 15/502* (2013.01); *G03G 15/5079* (2013.01); *G06Q 10/0875* (2013.01)

(58) Field of Classification Search
CPC .................. G03G 15/5079; G03G 15/556
See application file for complete search history.

(56) References Cited

U.S. PATENT DOCUMENTS

| 5,923,917 A | 7/1999 | Sakurai et al. |
| 6,249,774 B1 | 6/2001 | Roden et al. |

(Continued)

FOREIGN PATENT DOCUMENTS

| EP | 3051470 A1 | 8/2016 |
| EP | 3139325 A1 | 3/2017 |

(Continued)

OTHER PUBLICATIONS

Machine Translation of Japanese Office Action dated Mar. 22, 2024, in related Japanese Patent Application No. 2023-076311.*

(Continued)

*Primary Examiner* — Sevan A Aydin
(74) *Attorney, Agent, or Firm* — VENABLE LLP

(57) ABSTRACT

An information processing apparatus communicating with an image forming apparatus on which toner containers containing toners of different colors are mounted and which forms an image using the toners of different colors includes an acquisition unit configured to acquire, for each color, a stock request of a toner container to be stocked being different from the toner containers mounted on the image forming apparatus, and a display unit configured to display, for each color, stock information indicating that stocking of a spare toner container is required, in accordance with the stock request acquired by the acquisition unit.

26 Claims, 10 Drawing Sheets

Related U.S. Application Data continuation of application No. 16/255,272, filed on Jan. 23, 2019, now Pat. No. 10,901,357.

(56) References Cited

U.S. PATENT DOCUMENTS

| | | |
|---|---|---|
| 6,343,193 B1 | 1/2002 | Matsumoto et al. |
| 8,184,997 B2 | 5/2012 | Hadano |
| 8,364,047 B2 | 1/2013 | Hadano |
| 8,792,793 B2 | 7/2014 | Kawai et al. |
| 9,787,859 B2 | 10/2017 | Shishido |
| 10,270,922 B2 | 4/2019 | Kaneko |
| 11,235,584 B2 | 2/2022 | Hirai et al. |
| 2006/0245780 A1 | 11/2006 | Yamada |
| 2008/0232828 A1 | 9/2008 | Golding et al. |
| 2008/0232829 A1 | 9/2008 | Golding et al. |
| 2008/0267642 A1 | 10/2008 | Hadano |
| 2010/0046966 A1 | 2/2010 | Ito |
| 2011/0311243 A1 | 12/2011 | Kawai et al. |
| 2012/0176636 A1 | 7/2012 | Ormond |
| 2012/0213534 A1 | 8/2012 | Watanabe et al. |
| 2016/0350661 A1 | 12/2016 | Sato et al. |
| 2018/0059605 A1 | 3/2018 | Hongu |

FOREIGN PATENT DOCUMENTS

| | | |
|---|---|---|
| JP | H11-084953 A | 3/1999 |
| JP | 2008-269476 A | 11/2008 |
| JP | 2013-061880 A | 4/2013 |
| JP | 2014-091298 A | 5/2014 |
| JP | 2015-090384 A | 5/2015 |
| JP | 2017-049748 A | 3/2017 |
| JP | 2018-004779 A | 1/2018 |

OTHER PUBLICATIONS

Extended European Search Report dated Jun. 17, 2019, issued in European Application No. 19150303.6.
Japanese Office Action dated Jan. 14, 2022, in related Japanese Patent Application No. 2018-014119.
Japanese Office Action dated Mar. 22, 2024, in related Japanese Patent Application No. 2023-076311.

* cited by examiner

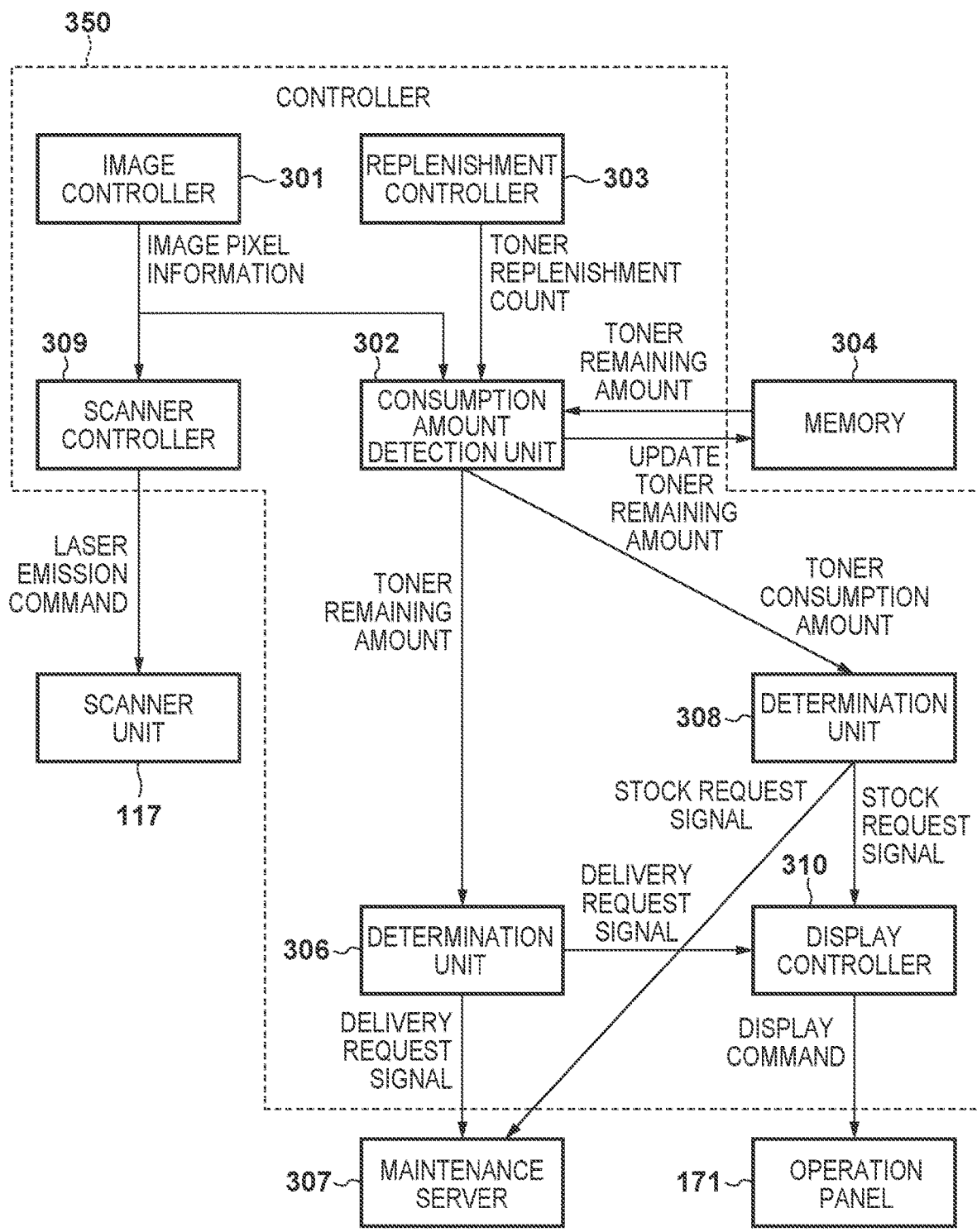

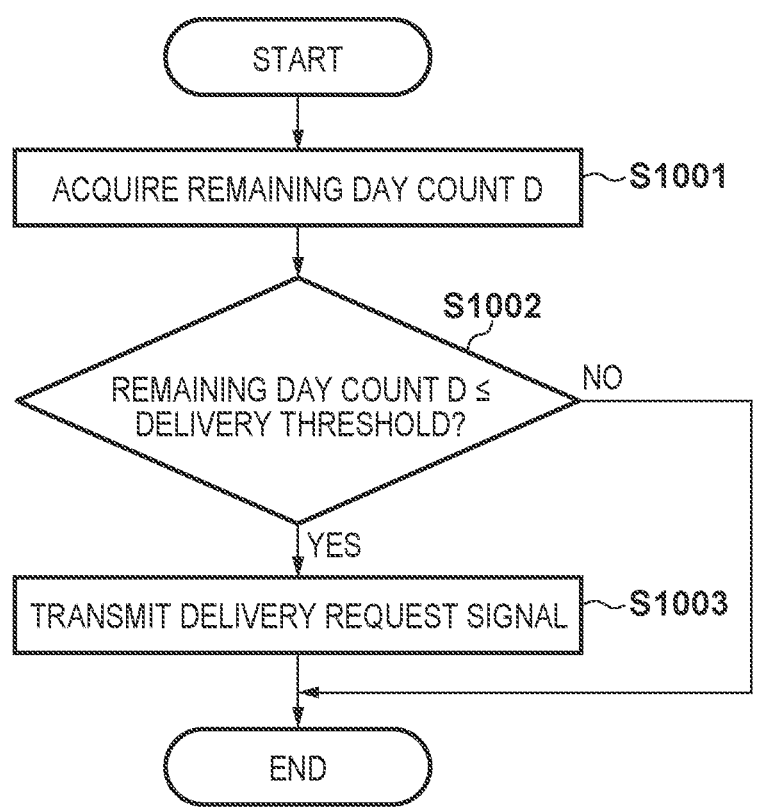

INFORMATION PROCESSING APPARATUS, METHOD OF CONTROLLING INFORMATION PROCESSING APPARATUS, AND IMAGE FORMING APPARATUS

This application is a continuation of application Ser. No. 17/123,475, filed Dec. 16, 2020, which is a continuation of application Ser. No. 16/255,272, filed Jan. 23, 2019, now U.S. Pat. No. 10,901,357, issued Jan. 26, 2021.

BACKGROUND OF THE INVENTION

Field of the Invention

The present invention relates to a consumable management technique.

Description of the Related Art

As image forming apparatuses that form an image on a printing medium such as paper and output the image, there are known apparatuses such as copying machines, printers, and facsimile apparatuses based on an electrophotographic method, inkjet printers, and multifunction peripherals as combinations of such devices, image reading functions, and the like. Such image forming apparatuses form and output images while consuming consumables such as toner, ink, and paper. In addition, a consumable part (the above consumables and consumable parts will be collectively referred to as consumables hereinafter) such as a photosensitive member used in an image forming process becomes more contaminated with toner or ink or undergoes more wear of the frictional portion with the lapse of usage period, disabling a desired function. For this reason, predetermined component lives are provided for such consumables. When such consumables are used up or have reached component lives, the image forming apparatus cannot output normal images.

In order to stably operate the image forming apparatus, the following measures are required. Before a certain consumable is used up or reaches a predetermined component life, a spare consumable for replacement is delivered to the user. The user temporarily stocks the consumable to prepare for quick replacement when replenishment or replacement (to be collectively referred to as replacement hereinafter) is required.

As a delivery management technique for spare consumables like that described above, there is known a technique of determining the delivery timing of a spare consumable based on the history of the consumable used by the user. For example, the automatic consumable purchase system disclosed in U.S. Pat. No. 6,249,774 supplies consumables in accordance with actual demands by the user by predicting the future demands of consumables from the use histories of the consumables obtained in the early period of use by the user.

In predicting the future demand of a consumable based on the use history of the consumable by the user in the past, the future demand is generally predicted by using a mathematical model obtained from the past history. In practice, however, when the actual consumption amount in an image forming apparatus by the user deviates from the mathematical model, for example, when an exceptionally large demand unexpectedly occurs as compared with the demand prediction of a consumable, and such an unexpected large demand repeats, a predicted demand greatly differs from an actual demand. As a result, a consumable cannot be delivered in time for the required timing of replacement of the consumable. This disables the use of the image forming apparatus.

SUMMARY OF THE INVENTION

The present invention provides a technique for preventing the shortage of a consumable in an image forming apparatus even in a case in which the actual consumption amount of the consumable in the apparatus does not comply with an assumed mathematical model.

According to the first aspect of the present invention, there is provided an information processing apparatus communicably connected to an image forming apparatus, the information processing apparatus comprising: an acquisition unit configured to acquire a consumption amount of a consumable in the image forming apparatus; an output unit configured to output a delivery request for a replacement consumable based on the consumption amount acquired by the acquisition unit; and a notification unit configured to notify information for prompting to stock a spare replacement consumable based on the consumption amount.

According to the second aspect of the present invention, there is provided a method of controlling an information processing apparatus communicably connected to an image forming apparatus, the method comprising: acquiring a consumption amount of a consumable in the image forming apparatus; outputting a delivery request for a replacement consumable based on the acquired consumption amount; and notifying information for prompting to stock a spare replacement consumable based on the consumption amount.

According to the third aspect of the present invention, there is provided an image forming apparatus comprising: a first controller configured to control outputting of a first signal for prompting a first preparation as a preparation for a replacement consumable based on an estimated consumption amount and/or a remaining amount of a consumable used for image formation in the image forming apparatus; and a second controller configured to control outputting of a second signal for prompting a second preparation different from the first preparation as a preparation for a replacement consumable based on the estimated consumption amount.

Further features of the present invention will become apparent from the following description of exemplary embodiments (with reference to the attached drawings).

BRIEF DESCRIPTION OF THE DRAWINGS

FIG. 8 is a block diagram showing an example of the configuration of an image forming apparatus 101 associated with consumable delivery management;

FIG. 10 is a flowchart showing the operation of a determination unit 306.

DESCRIPTION OF THE EMBODIMENTS

An embodiment of the present invention will be described below with reference to the accompanying drawings. Note that the embodiment described below is an example in which the present invention is specifically embodied, and is a specific embodiment of the configuration described in the scope of the claims.

First Embodiment

Figure 1:
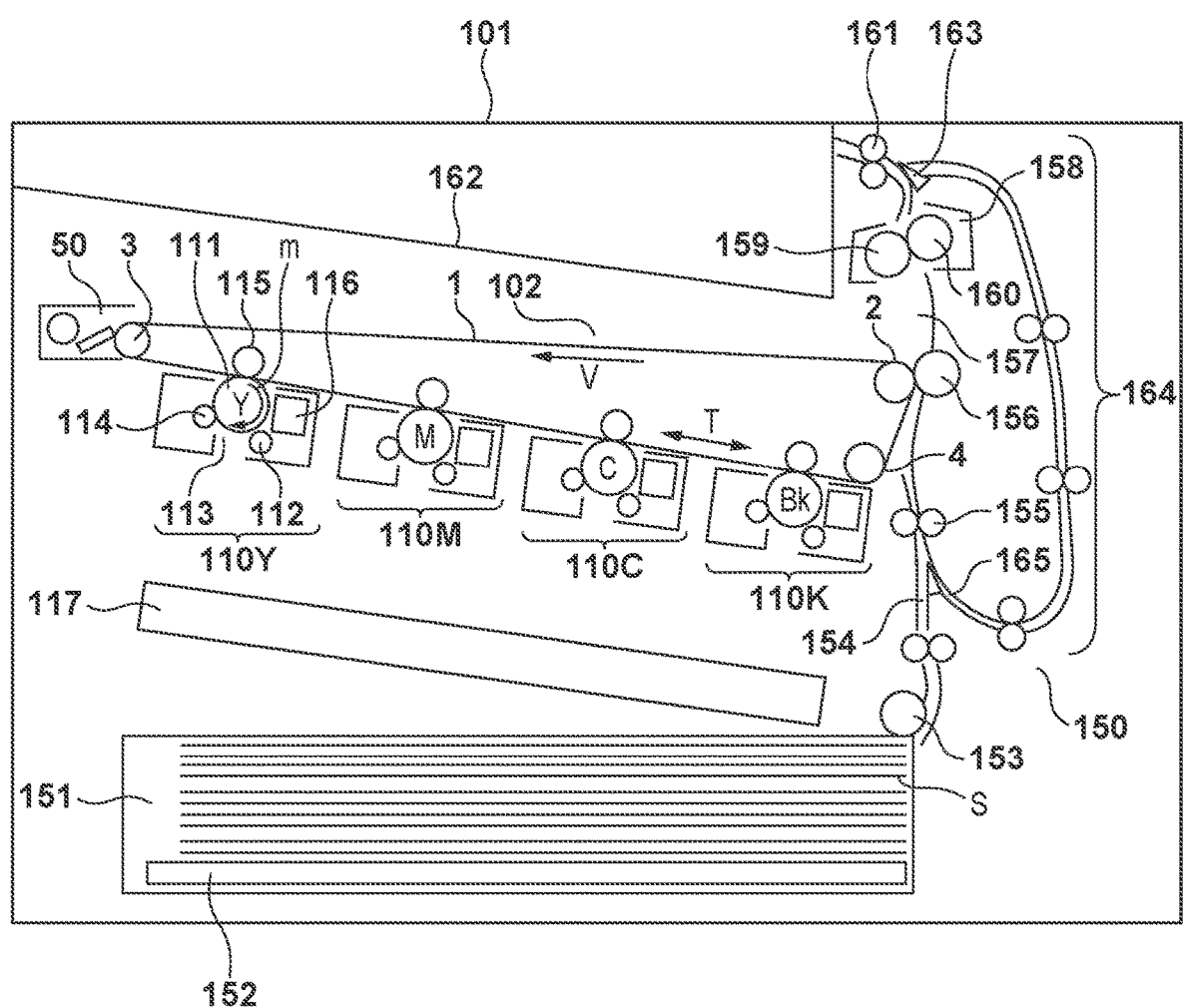
FIG. 1 is a sectional view of an image forming apparatus 101.

Main components associated with an image forming process by an image forming apparatus according to this embodiment will be described first with reference to FIG. 1. Examples of methods that can be applied to the image forming apparatus according to the embodiment include a plurality of methods such as an electrophotographic method, an offset printing method, and an inkjet method. The embodiment will exemplify an image forming apparatus as an example which can perform color printing by using the electrophotographic method. FIG. 1 shows main components (some components) associated with an image forming process by an image forming apparatus 101 that can perform color printing by using the electrophotographic method.

FIG. 1 is a sectional view of the image forming apparatus 101 based on a so-called intermediate transfer tandem method, in which four color image forming units are arranged side by side on an intermediate transfer belt. This type of apparatus is excellent in ability to cope with thick paper and productivity, and hence has recently become the mainstream. The toner images formed by image forming units 110Y, 110M, 110C, and 110K are transferred onto a printing material S conveyed by a paper conveying unit 150 via an intermediate transfer belt unit 102, thereby forming an image on the printing material S. Image formation on the printing material S will be described below.

<Conveying Process of Printing Material S>

Printing materials S are stored in a printing material storing unit 151 so as to be stacked on a lift-up device 152 in the printing material storing unit 151, and are fed by a paper feed roller 153 in accordance with an image formation timing. Obviously, another paper feed method may be used. The printing material S fed out by the paper feed roller 153 passes through a paper feed convey path 154, and is conveyed to registration rollers 155. After skew correction and timing correction are performed at the registration rollers 155, the printing material S is sent to the secondary transfer unit. The secondary transfer unit is a transfer nip unit constituted by a secondary transfer inner driving roller 2 as the first secondary transfer member and a secondary transfer outer roller 156 as the second secondary transfer member, which face each other. A toner image on the intermediate transfer belt is transferred onto the printing material S by being given a predetermined pressurizing force and electrostatic load bias.

<Image Forming Process>

An image forming process up to the secondary transfer unit, which is executed at a timing similar to that in the above conveying process of the printing material S to the secondary transfer unit, will be described. The image forming apparatus 101 according to this embodiment includes an image forming unit 110Y that forms an image with yellow (Y) toner, an image forming unit 110M that forms an image with magenta (M) toner, an image forming unit 110C that forms an image with cyan (C) toner, and an image forming unit 110K that forms an image with black (BK) toner. The image forming unit 110Y, the image forming unit 110M, the image forming unit 110C, and the image forming unit 110K have similar configurations except for different toner colors, and operate similarly. For this reason, the configuration and operation of the image forming unit 110Y as a typical example will be described below. In addition, in giving a description common to the image forming unit 110Y, the image forming unit 110M, the image forming unit 110C, and the image forming unit 110K, the image forming unit 110Y, the image forming unit 110M, the image forming unit 110C, and the image forming unit 110K each will be referred to as an image forming unit 110.

The image forming unit 110Y as a toner image forming unit includes a photosensitive member 111 as an image carrier, a charger 112 that charges the photosensitive member 111, an exposure unit 113, a developing device 114, a primary transfer roller 115, and a photosensitive member cleaner 116. The charger 112 uniformly charges the surface of the photosensitive member 111 rotating in the direction indicated by an arrow m in FIG. 1. A scanner unit 117 including a laser, a polygon mirror, and a correction lens outputs laser light modulated in accordance with the image data transmitted from an image controller 301 (to be described later). When this laser light is reflected by a folding mirror and the exposure unit 113 exposes the charged photosensitive member 111, an electrostatic latent image is formed. The developing device 114 develops the electrostatic latent image formed on the photosensitive member 111 with the toner electrostatically charged by the developing device 114, thereby forming a toner image on the photosensitive member 111. Thereafter, when the primary transfer roller 115 gives a predetermined pressurizing force and electrostatic load bias to the toner image, the yellow toner image is transferred onto an intermediate transfer belt 1 as a belt member. Subsequently, the transfer residual toner left on the photosensitive member 111 is recovered by the photosensitive member cleaner 116, thereby preparing for the next image formation.

The image forming unit 110 described above exists for each of four sets of toner, namely yellow (Y) toner, magenta (M) toner, cyan (C) toner, and black (Bk) toner in FIG. 1. Accordingly, the magenta toner image formed by the image forming unit 110M is transferred onto the yellow toner image formed on the intermediate transfer belt 1. The cyan toner image formed by the image forming unit 110C is transferred onto the magenta toner image formed on the intermediate transfer belt 1. The black toner image formed by the image forming unit 110K is transferred onto the cyan toner image formed on the intermediate transfer belt 1. The toner images of the different colors are formed and stacked on the intermediate transfer belt 1 in this manner to form a full-color image on the intermediate transfer belt 1. Although in this embodiment, the four toner colors are used, the number of colors is not limited to four, and the order of the colors is not limited to that described above.

The intermediate transfer belt unit 102 including the intermediate transfer belt 1 will be described next. The intermediate transfer belt 1 is stretched over the secondary transfer inner driving roller 2 serving both as a driving member and a secondary transfer inner member, a tension roller 3 that gives a predetermined tensile force to the intermediate transfer belt 1, and a pre-secondary transfer roller 4. The intermediate transfer belt 1 is a belt member that is conveyed and driven in the direction indicated by an arrow V in FIG. 1. The pre-secondary transfer roller 4 is arranged upstream of the secondary transfer inner driving roller 2, and the tension roller 3 is arranged downstream of the secondary transfer inner driving roller 2 in the conveying direction V of the intermediate transfer belt 1. The primary transfer roller 115 is provided between the tension roller 3 and the pre-secondary transfer roller 4. The tension roller 3 and the pre-secondary transfer roller 4 are not driven but rotate following the conveyance of the intermediate transfer belt 1.

The tension roller 3 is held so as to be movable in the direction indicated by an arrow T in FIG. 1 (parallel to a plane formed by the intermediate transfer belt 1 stretched between the tension roller 3 and the pre-secondary transfer roller 4), and is biased by a biasing unit (not shown). This gives a tensile force to the intermediate transfer belt 1. The outer circumferential portion of the secondary transfer inner driving roller 2 is formed from conductive EPDM so as to allow the secondary transfer inner driving roller 2 to convey the intermediate transfer belt 1 with a frictional force while the tension roller 3 gives a tensile force to the intermediate transfer belt 1. An initial frictional resistance μ of the outer circumferential surface of the secondary transfer inner driving roller 2 is set to about 1.0 to 1.5. In addition, an intermediate transfer cleaner 50 that removes toner left on the intermediate transfer belt 1 is fixed on the opposite side of the intermediate transfer belt 1 to the tension roller 3.

The intermediate transfer belt 1 is an endless belt formed from polyimide and having a perimeter of 792 mm, a width of 346 mm, and a thickness of 60 μm. The material of the intermediate transfer member is not limited to this. Other than the above belt, it is possible to use a belt formed from polycarbonate, PVDF, ETFE, PTFE, or the like.

The image forming units 110Y, 110M, 110C, and 110K concurrently perform image forming processes of the respective colors at the timings at which toner images of upstream colors are primarily transferred onto the intermediate transfer belt 1 so as to be superimposed on each other. As a result, a full-color toner image is finally formed on the intermediate transfer belt 1 and transferred onto the secondary transfer unit. Note that the number of rollers over which the intermediate transfer belt 1 is stretched is not limited to that in the configuration shown in FIG. 1. In addition, the material of the secondary transfer inner driving roller 2 and the initial frictional resistance of its outer circumferential surface are not limited to those in the above configuration.

<Processes after Secondary Transfer>

The full-color toner image formed on the intermediate transfer belt 1 by the secondary transfer unit is secondarily transferred onto the printing material S through the conveying process for the printing material S and the image forming process described respectively above. A pre-fixing conveying unit 157 then conveys the printing material S to a fixing device 158. The fixing device 158 may adopt various configurations and methods. Referring to FIG. 1, the fixing device 158 is configured to fuse and fix a toner image on the printing material S by giving a predetermined pressurizing force and a predetermined amount of heat to the toner image in the fixing nip formed by a fixing roller 159 and a pressure roller 160, which face each other. In this case, the fixing roller 159 incorporates a heater as a heat source, and the pressure roller 160 is biased toward the fixing roller 159. The printing material S conveyed to delivery/reverse rollers 161 through the fixing device 158 undergoes path selection between being directly delivered onto a delivery tray 162 and being guided to a branching device 163 and conveyed to a double-sided conveying device 164 when it is necessary to perform double-sided image formation. When it is necessary to perform double-sided image formation, the delivery/reverse rollers 161 switch back the printing material S to invert it, which is then conveyed to the double-sided conveying device 164. Thereafter, the printing material S enters the paper feed convey path 154 from a re-feed path 165 in accordance with the timing of the printing material subjected to the subsequent job which is conveyed from the paper feed roller 153, and is sent to the secondary transfer unit in the same manner as described above. An image forming process for the reverse surface (second surface) is the same as that for the obverse surface (first surface) described above, and hence a description of the process will be omitted.

<Toner Replenishment from Toner Bottle>

Figure 2:
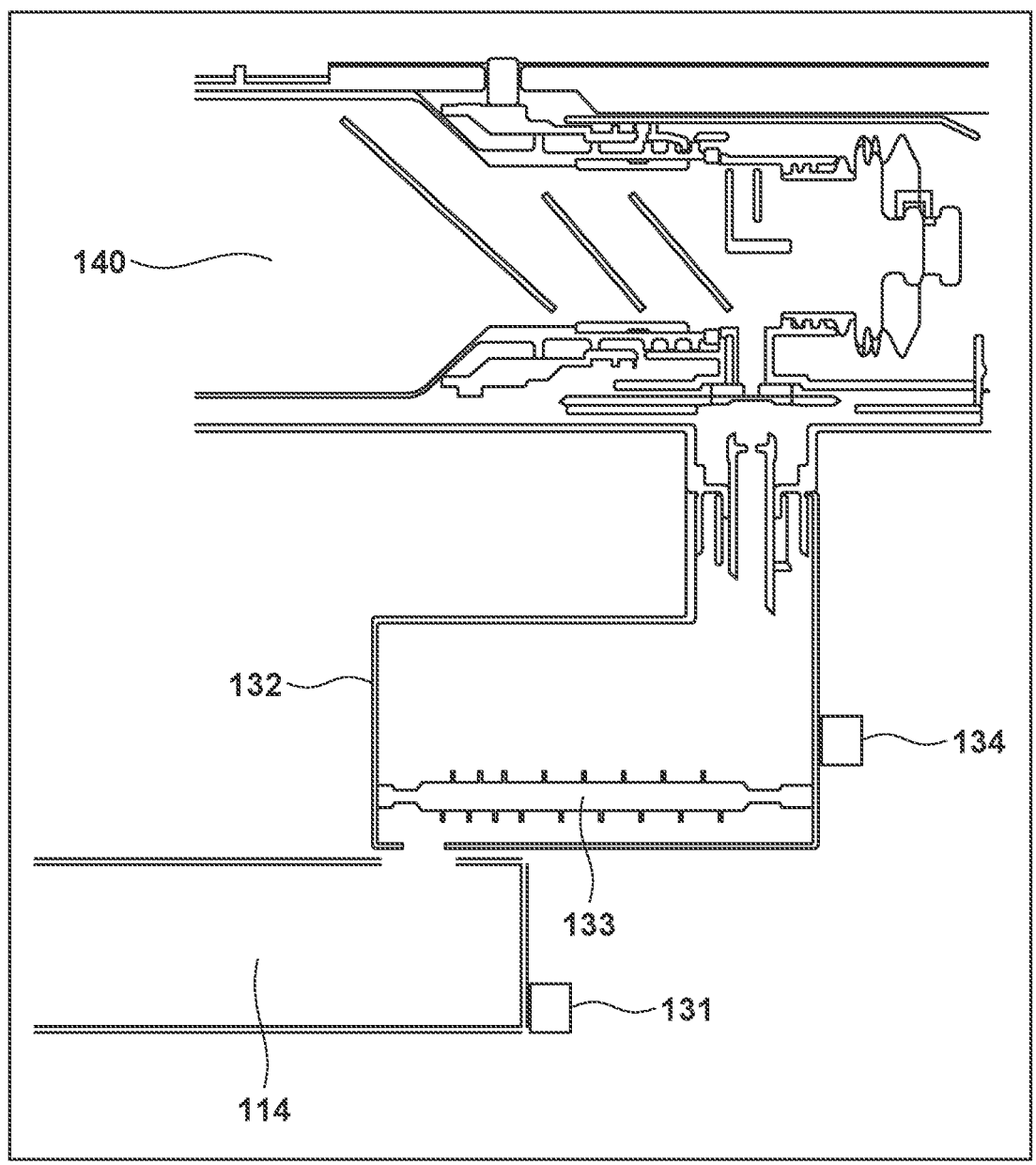
FIG. 2 is a view for explaining toner replenishment from a toner bottle as a consumable.

Toner replenishment from a toner bottle as a consumable will be described with reference to FIG. 2. In the above image forming process, a toner image is formed by consuming toner contained in the developing device 114. Accordingly, every image forming process will reduce toner in the developing device 114. A developing toner amount detection sensor 131 provided in the developing device 114 detects whether a predetermined amount or more of toner is contained in the developing device 114. When the amount of toner in the developing device 114 becomes smaller than the predetermined amount, toner contained in a hopper 132 coupled to the developing device 114 is replenished into the developing device 114. A replenishing screw 133 is provided in the hopper 132. Controlling the amount of rotation of the replenishing screw 133 can replenish a predetermined amount of toner into the developing device 114. In this case, when the amount of toner contained in the hopper 132 becomes equal to or less than the predetermined amount, an accurate amount of toner cannot be replenished to the developing device 114 regardless of the amount of rotation of the replenishing screw 133. A hopper toner amount detection sensor 134 provided in the hopper 132 detects whether a predetermined amount or more of toner is contained in the hopper 132. When the amount of toner in the hopper 132 becomes smaller than the predetermined amount, toner contained in a toner bottle 140 is replenished into the hopper 132. Note that as the developing toner amount detection sensor 131 and the hopper toner amount detection sensor 134, inductance sensors that measure magnetic permeability or powder level sensors using piezoelectric transducers can be used. However, they are not exhaustive.

The toner bottle 140 is configured to be detachable from the image forming apparatus 101. When the toner bottle 140 is mounted on a bottle mount (not shown) provided in the image forming apparatus 101, the replenishment port shutter provided in the replenishment port of the toner bottle 140 is opened. A spiral toner conveying unit is formed in the toner bottle 140. When an instruction to replenish toner to the hopper 132 is issued, the toner bottle 140 is rotated to convey toner in the toner bottle 140 in the direction of the replenishment port. In addition, as the toner bottle 140 rotates, the toner bottle 140 contracts. With this operation, toner in the toner bottle 140 which has been conveyed near the replenishment port is discharged through the replenishment port by pumping accompanying the contracting operation of the toner bottle 140 and replenishes to the hopper 132.

As described above, because toner consumed by the developing device 114 is finally supplied from the toner bottle 140, continuing the image forming process will use up toner in the toner bottle 140. However, because the toner bottle 140 is configured to be detachable from the image forming apparatus 101, replacing the toner bottle 140 with a new toner bottle containing toner allows the image forming apparatus 101 to continue the image forming process.

<Consumable Delivery Management>

Figure 3:
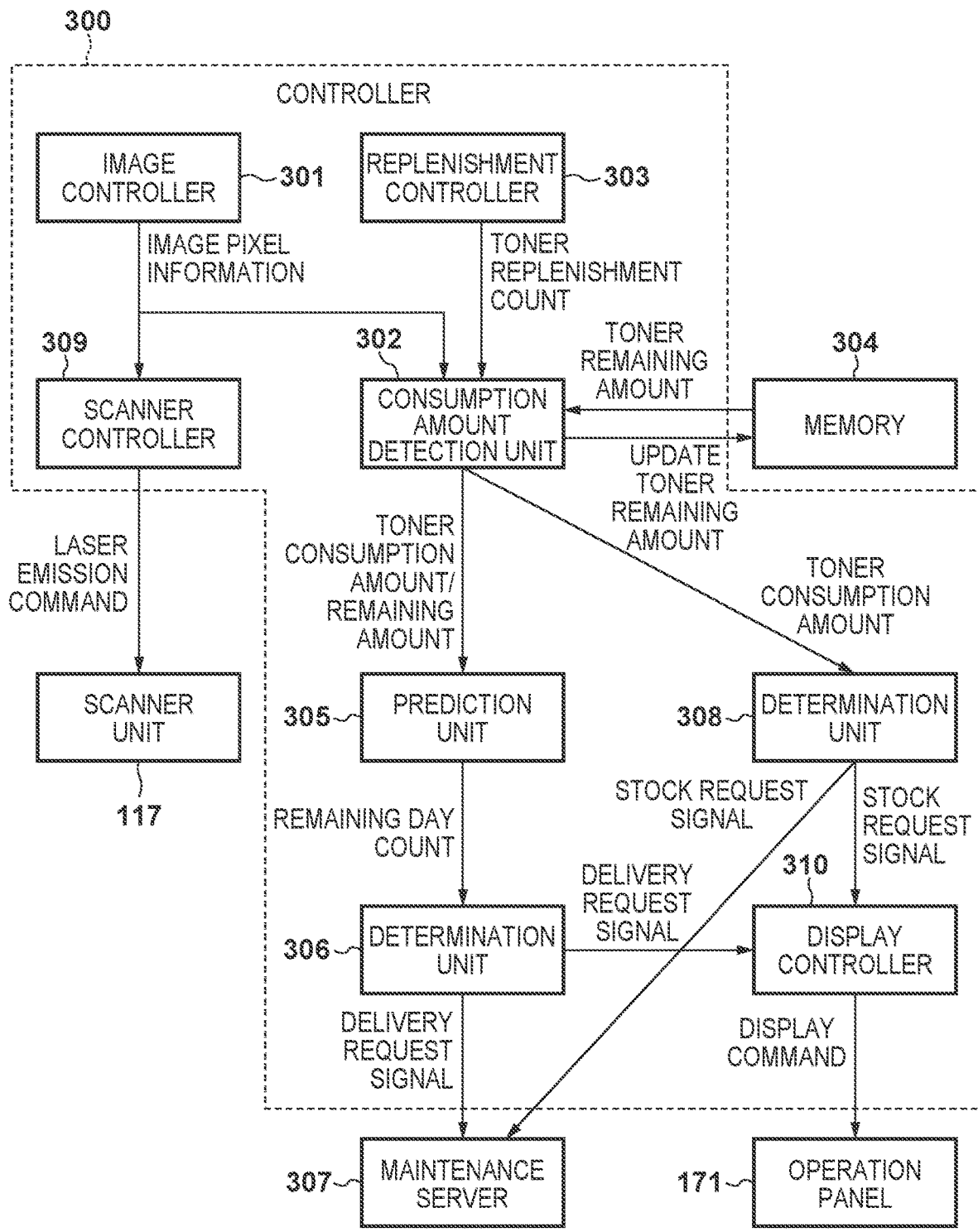
FIG. 3 is a block diagram showing an example of the configuration of the image forming apparatus 101 associated with consumable delivery management.

An example of the configuration of the image forming apparatus 101 associated with consumable delivery management used by the image forming apparatus 101 for image formation will be described next with reference to the block diagram of FIG. 3. This embodiment will exemplify a case in which "the consumable used by the image forming apparatus 101 for image formation" is toner. However, "the consumable used by the image forming apparatus 101 for image formation" is not limited to toner.

A controller 300 can be implemented by using one or more processors and a memory. Assume that the one or more processors execute processing by using computer programs and data stored in the memory to make the controller 300 execute or control each processing described later.

An image controller 301 sends out image data to a scanner controller 309 and a consumption amount detection unit 302. The scanner controller 309 controls the emission timing of the scanner unit 117 by generating a laser emission command from the image data sent out from the image controller 301.

A replenishment controller 303 decides the operation timings of the replenishing screw 133 and the toner bottle 140 (the details of the operation timings are the same as those described above) based on the detection result obtained by the developing toner amount detection sensor 131 and the detection result obtained by the hopper toner amount detection sensor 134. The replenishment controller 303 implements the above toner replenishment using the replenishing screw 133 and the toner bottle 140 by rotating/driving motors for driving the replenishing screw 133 and the toner bottle 140 in accordance with the decided operation timings. Note that the replenishment controller 303 counts the number of times the toner bottle 140 is rotated as a "toner replenishment count", and notifies the consumption amount detection unit 302 of the counted "toner replenishment count".

A memory 304 is a memory provided for the toner bottle 140. The memory 304 stores the remaining amount of toner (toner remaining amount) contained in the toner bottle 140. Note that when the toner bottle 140 is unused, the memory 304 stores the weight of toner filled at the time of production as a toner remaining amount. The consumption amount detection unit 302 manages the toner remaining amount stored in the memory 304.

The operation of the consumption amount detection unit 302 will be described with reference to the flowchart of FIG. 4. The processing following the flowchart of FIG. 4 may be performed periodically (for example, every 1 sec) or irregularly (for example, for every image formation of a unit of printing such as 1 image or 1 page).

In step S100, the consumption amount detection unit 302 reads out a toner remaining amount $W_{T-1}$ stored in the memory 304. The "toner remaining amount $W_{T-1}$" is the toner remaining amount obtained in "the processing following the flowchart of FIG. 4" at the previous time (time (T-1) where T is the current time) and stored in the memory 304.

In step S101, the consumption amount detection unit 302 acquires image pixel information P from image data and also acquires a toner replenishment count N from the replenishment controller 303. The image pixel information P is the cumulative total value of pixel counts representing ON-dots obtained so far by image formation. The toner replenishment count N is the cumulative total value of the numbers of times the toner bottle 140 has been rotated so far.

In step S102, the consumption amount detection unit 302 obtains ΔP representing the result obtained by subtracting the pixel count indicating ON-dots represented by the image pixel information P acquired in step S101 in the previous processing from the pixel count indicating ON-dots represented by the image pixel information P acquired in step S101. The consumption amount detection unit 302 also obtains ΔN as the result obtained by subtracting the toner replenishment count N acquired in step S101 in the previous processing from the toner replenishment count N acquired in step S101.

In step S103, the consumption amount detection unit 302 calculates the following equation using ΔP, ΔN, a representative value of a toner consumption amount per pixel representing an ON-dot (a representative value of the consumption amount per pixel representing an ON-dot), and a representative value of a toner consumption amount per one toner replenishment (a representative value of the consumption amount per one replenishment).

$$Q[\text{mg}]=(0.015\times\Delta P+180\times\Delta N)/2$$

With this calculation, the consumption amount detection unit 302 obtains a toner consumption amount (estimated consumption amount) Q estimated to be used at current time T. According to this equation, representative value of toner consumption amount per dot=0.015 [mg], and representative value of toner consumption amount per one toner replenishment=180 [mg]. This equation is a calculus equation for obtaining a toner consumption amount estimated to be used at the current time by using the average of a toner consumption amount based on an output image and a toner consumption amount from the toner bottle.

In step S104, the consumption amount detection unit 302 obtains an accumulated toner consumption amount $U_T$ at current time T by adding an estimated consumption amount Q currently obtained in step S104 to the accumulated toner consumption amount $U_{T-1}$ obtained in step S104 at the previous time (time (T-1)). That is, the consumption amount detection unit 302 calculates $U_T=U_{T-1}+Q$. Assume that when T=1, 2, . . . , $U_0=0$.

In step S105, the consumption amount detection unit 302 obtains, as a toner remaining amount $W_T$ at current time T, a result ($W_{T-1}-Q$) obtained by subtracting the estimated consumption amount Q from the toner remaining amount $W_{T-1}$ read out from memory 304 in step S100.

In step S106, the consumption amount detection unit 302 updates the toner remaining amount $W_{T-1}$ stored in the memory 304 with the toner remaining amount $W_T$ obtained in step S105.

Figure 4:
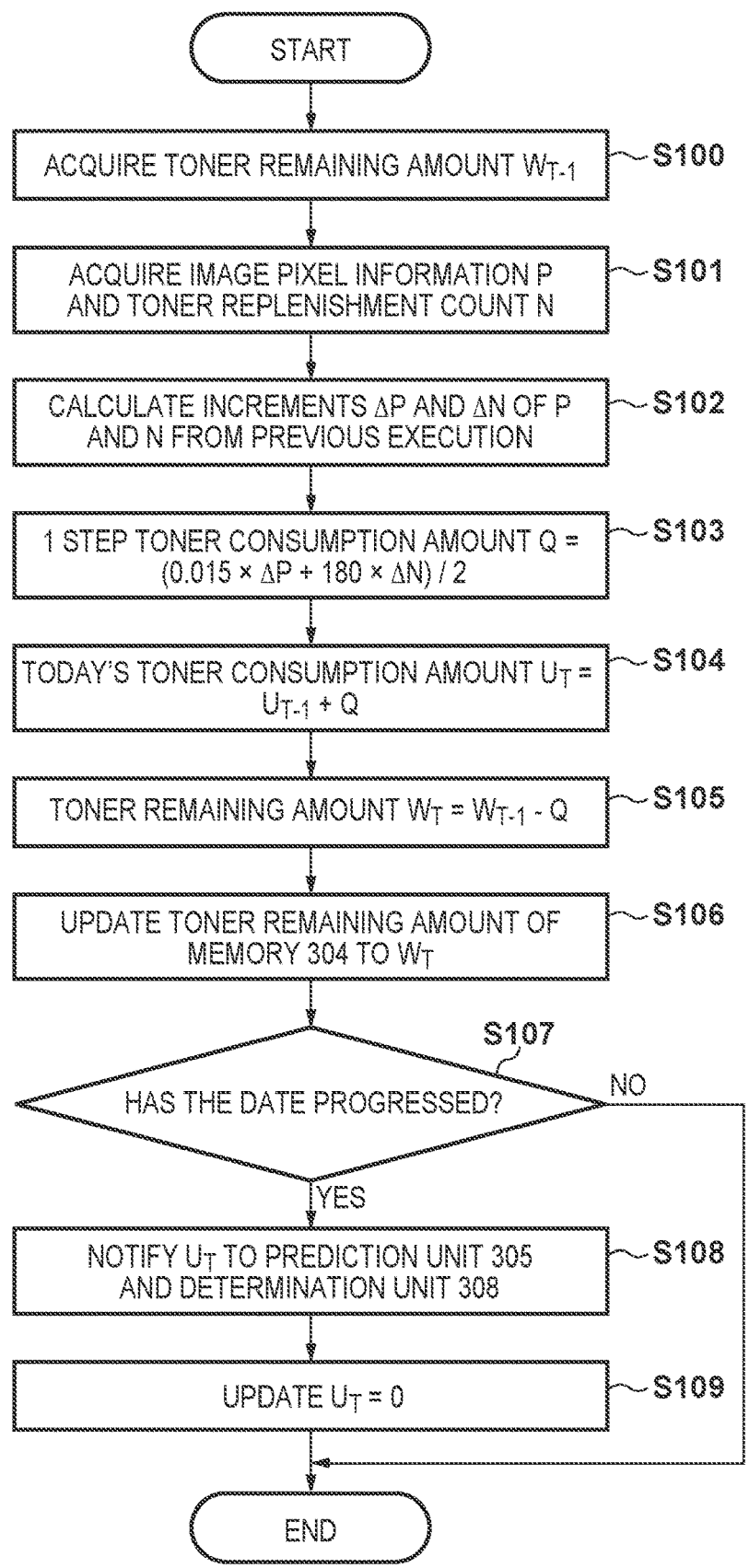
FIG. 4 is a flowchart showing the operation of a consumption amount detection unit 302.

In step S107, the consumption amount detection unit 302 acquires a current date by using, for example, a timer of the controller 300, and determines whether the current date is a date that is one or more days after the date when processing following the flowchart of FIG. 4 was previously executed. If this determination result indicates that the current date is a date that is one or more days after the date when the processing following the flowchart of FIG. 4 was previously executed, the process advances to step S108. In contrast, if the current date coincides with the date when the processing following the flowchart of FIG. 4 in the previous processing was executed, the processing following the flowchart of FIG. 4 is terminated.

In step S108, the consumption amount detection unit 302 sends out the accumulated toner consumption amount $U_T$ as "the toner consumption amount used in one day including current time T" (toner consumption amount per day) to a prediction unit 305 and a determination unit 308. The consumption amount detection unit 302 also sends out the toner remaining amount $W_T$ to the prediction unit 305. In step S109, the consumption amount detection unit 302 initializes $U_T$ to 0.

Referring back to FIG. 3, the prediction unit 305 obtains an average value $U_{AVE}$ of accumulated toner consumption amounts (the accumulated average of toner consumption amounts per day) acquired so far from the consumption amount detection unit 302 by calculating the following equation every time an accumulated toner consumption amount is acquired from the consumption amount detection unit 302.

$$U_{AVE} = \frac{\sum_{n=1}^{i} U_n}{i}$$

where i represents the number of times "toner consumption amount per day" is notified from the consumption amount detection unit 302, and $U_n$ represents a toner consumption amount per day at the nth notification. The prediction unit 305 then obtains a remaining day count D as the remaining usage period of toner left in the image forming apparatus 101 by calculating the following equation using an average value $U_{AVE}$ of accumulated toner consumption amounts and the toner remaining amount $W_T$ received from the consumption amount detection unit 302.

$$D[\text{day}] = W/U_{AVE}$$

The prediction unit 305 then sends out the obtained remaining day count D to a determination unit 306. The operation of the determination unit 306 will be described in accordance with the flowchart of FIG. 10. In step S1001, the determination unit 306 acquires the remaining day count D sent out from the prediction unit 305. In step S1002, the determination unit 306 determines whether the remaining day count D acquired in step S1001 is equal to or less than a predetermined delivery threshold (for example, 10 days). If this determination result indicates that the remaining day count D is equal to or less than the delivery threshold, the process advances to step S1003. If the remaining day count D is larger than the delivery threshold, the processing following the flowchart of FIG. 10 is terminated. In step S1003, the determination unit 306 determines that the toner bottle 140 will be used up soon, and generates a delivery request signal for prompting "delivery request" as an example of a preparation request for a replacement toner bottle (replacement consumable). The determination unit 306 sends out the generated delivery request signal to a display controller 310, and also transmits the generated delivery request signal to an outside maintenance server 307 via a network.

Figure 5:
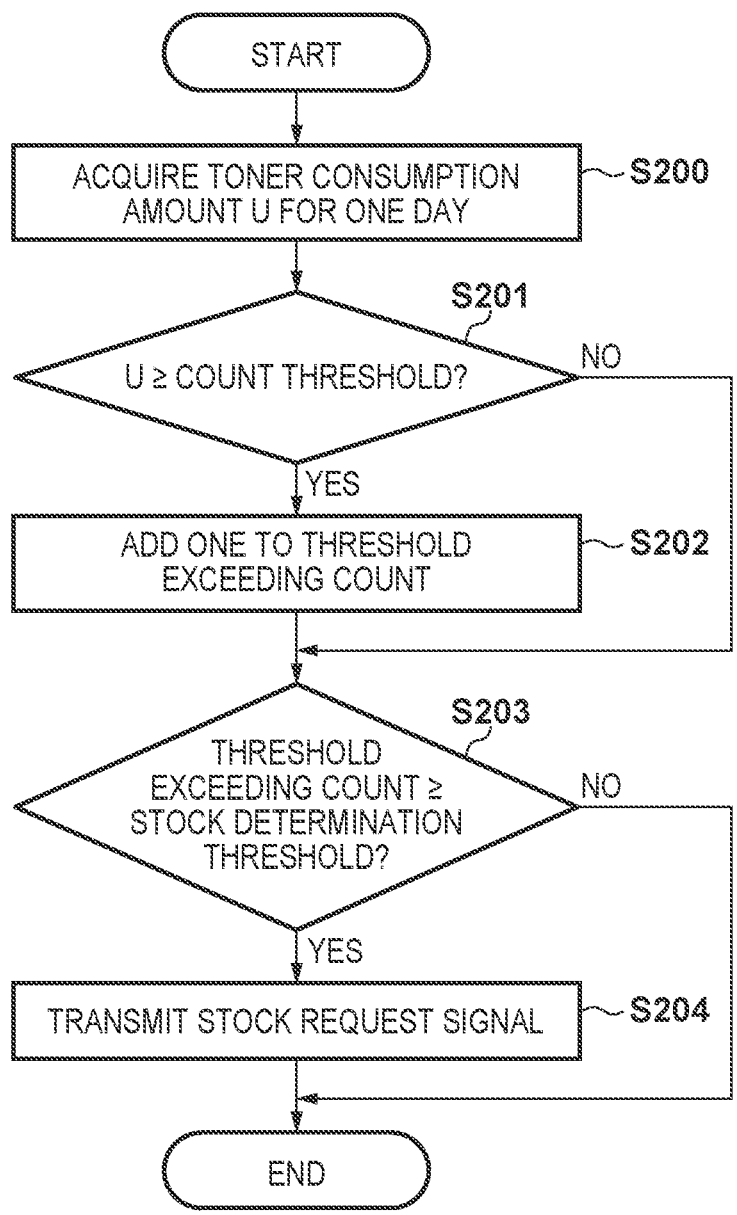
FIG. 5 is a flowchart showing the operation of a determination unit 308.

The operation of the determination unit 308 will be described next with reference to the flowchart of FIG. 5. The determination unit 308 performs processing following the flowchart of FIG. 5 every time the consumption amount detection unit 302 outputs an accumulated toner consumption amount.

In step S200, the determination unit 308 acquires the accumulated toner consumption amount sent out from the consumption amount detection unit 302. In step S201, the determination unit 308 determines whether the accumulated toner consumption amount acquired in step S200 is equal to or more than a predetermined amount (count threshold) (for example, 70,000 [mg]). If this determination result indicates that the accumulated toner consumption amount acquired in step S200 is equal to or more than the predetermined amount, the process advances to step S202. If the accumulated toner consumption amount acquired in step S200 is less than the predetermined amount, the process advances to step S203.

In step S202, the determination unit 308 increments a threshold exceeding count by one. Note that the threshold exceeding count is set to 0 when the user starts using the image forming apparatus 101.

In step S203, the determination unit 308 determines whether the threshold exceeding count is equal to or more than a predetermined stock determination threshold (for example, 2). If this determination result indicates that the threshold exceeding count is equal to or more than the predetermined stock determination threshold, the process advances to step S204. If the threshold stock count is less than the predetermined stock determination threshold, the processing following the flowchart of FIG. 5 is terminated.

In step S204, the determination unit 308 generates a stock request signal for prompting "stock request" as an example of a preparation request for a replacement toner bottle. The determination unit 308 sends out the generated stock request signal to the display controller 310, and also transmits the generated stock request signal to the maintenance server 307 via a network. The stock request signal corresponds to information for prompting to stock a spare replacement consumable.

That is, the determination unit 308 detects that the user has consumed a large amount of toner per day equal to or more than a predetermined amount, and determines, if the detected tendency repeats, that it is highly likely that the user will unexpectedly consume a large amount of consumable greatly exceeding the accumulated average of toner consumption amounts per day. In such a case, the determination unit 308 determines that it is highly likely that the time at which toner will be delivered to the installation place of the image forming apparatus 101 after issuance of a toner delivery request will delay from the timing at which toner is used up, and notifies that toner should be stocked at the installation place of the image forming apparatus 101.

Note that in this embodiment, the repeatability of large consumption by the user is evaluated with a stock determination threshold (twice). However, in order to more reliably prevent the delay of toner delivery, the stock determination threshold may be set to "once". Alternatively, the history of toner consumption amounts per day each acquired as the date progresses may be statistically processed, so that when the appearance frequency of outliers (toner consumption amounts) from a significant distribution (a distribution prepared in advance as a distribution of normal toner consumption amounts) is higher than a threshold, a stock request signal may be output.

Although in this embodiment, the quantity of toner to be stocked is set to 1 (fixed value), the quantity of toner to be stocked may be changed depending on determination performed by the determination unit 308. For example, if the number of times the accumulated toner consumption amount acquired in step S200 has become equal to or more than a first threshold is equal to or more than a stock determination threshold, the quantity of toner to be stocked may be set to 1, whereas if the number of times the accumulated toner consumption amount acquired in step S200 has become equal to or more than a second threshold (≠ first threshold)

is equal to or more than a stock determination threshold, the quantity of toner to be stocked may be set to 2.

Figure 6:
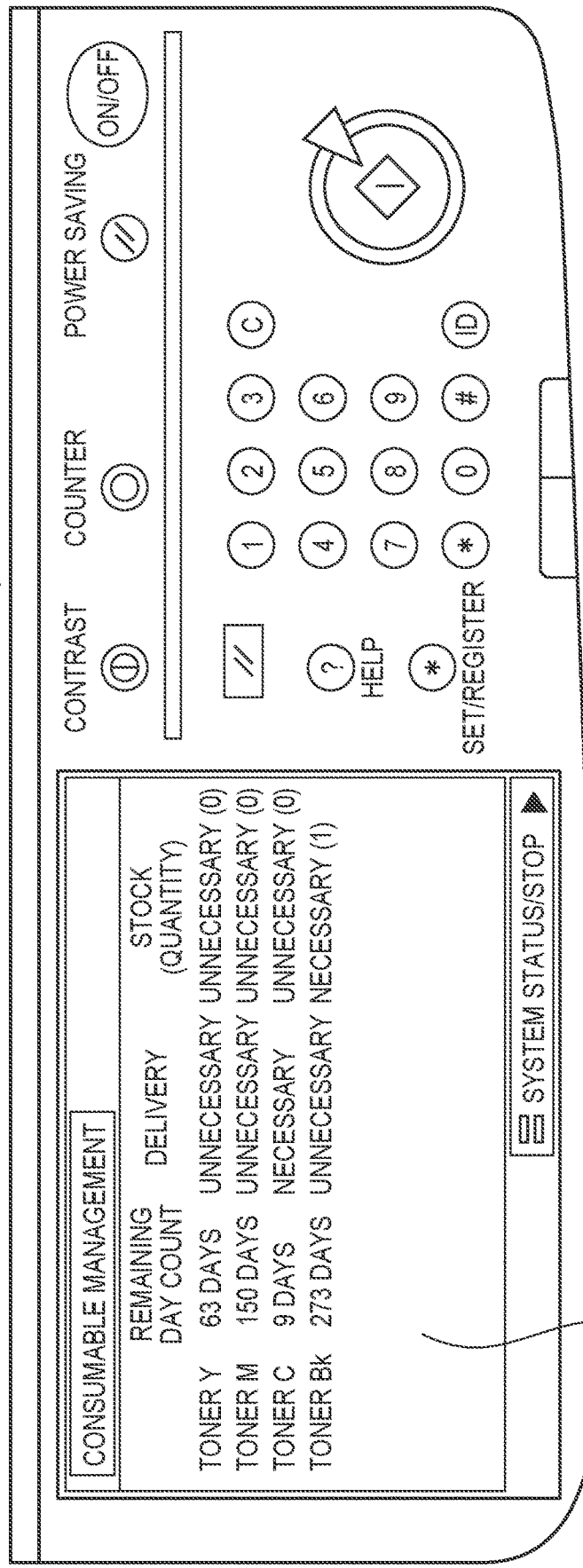
FIG. 6 is a view showing an example of display on a display screen 600 of an operation panel 171.

Referring back to FIG. 3, the display controller 310 controls display on the display screen of an operation panel 171 of the image forming apparatus 101, and performs display in accordance with a delivery request signal from the determination unit 306 or a stock request signal from the determination unit 308. FIG. 6 shows a display example on a display screen 600 of the operation panel 171. The display screen 600 displays a list of information concerning toner of each of the colors (toner Y, toner M, toner C, and toner Bk) which the image forming apparatus 101 has, including the remaining day count D obtained for the toner, necessity/unnecessity of delivery of the toner, and necessity/unnecessity to stock the toner (the quantity of toner to be stocked). On the column of "necessity/unnecessity of delivery of toner", "necessary" is displayed when the display controller 310 has received a delivery request signal concerning the toner, whereas "unnecessary" is displayed when the display controller 310 has not received the signal. On the column of "necessity/unnecessity to stock the toner (the quantity of toner to be stocked)", "necessary (1)" is displayed when the display controller 310 has received a stock request signal concerning the toner, whereas "unnecessary (0)" is displayed when the display controller 310 has not received the signal. Although "the quantity of toner to be stocked" is "1" in FIG. 6, when "the quantity of toner to be stocked" is to be changed depending on the situation as described above, a changed quantity Num is displayed like, for example, "necessary (Num)".

The maintenance server 307 is a server device connected to the image forming apparatus 101 wirelessly and/or via a wired network, and performs display in accordance with a delivery request signal from the determination unit 306 or a stock request signal from the determination unit 308. Display contents include, for example, as shown in FIG. 6, "necessity/unnecessity of delivery of toner" for each toner and "necessity/unnecessity to stock the toner (the quantity of toner to be stocked)". The maintenance server 307 displays such display contents to allow the operator of the maintenance server 307 to check the display contents and recognize the necessity/unnecessity to replace toner or stock toner (including the quantity of toner to be delivered). This makes it possible to deliver replacement toner to the installation place of the image forming apparatus 101 at a proper timing.

Figure 7A:
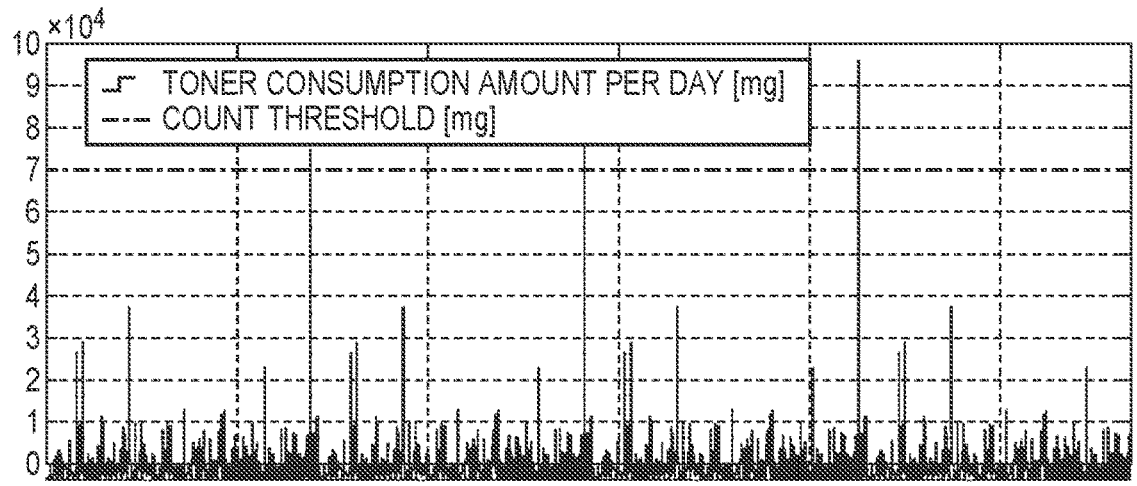
FIGS. 7A to 7C are graphs showing an example of a simulation.
Figure 7B:
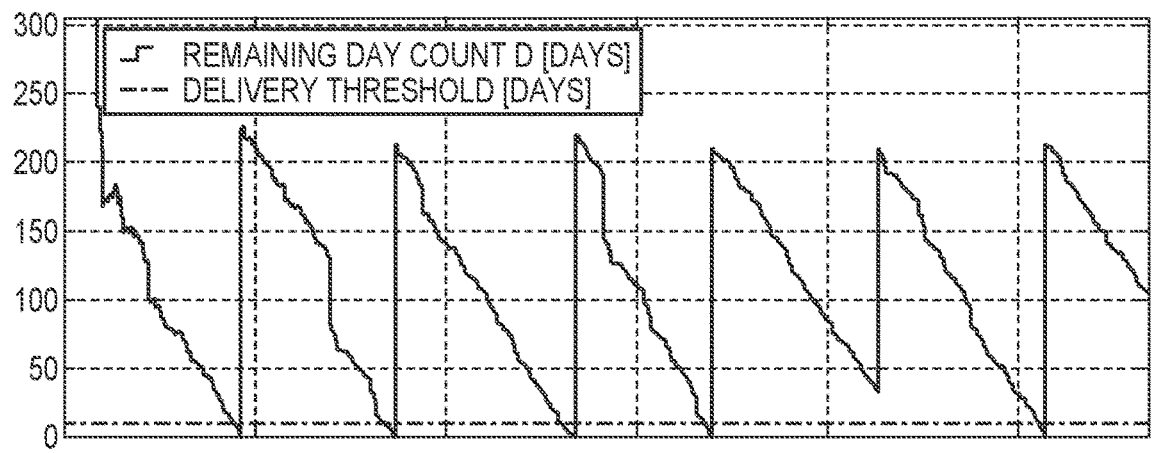
Figure 7C:
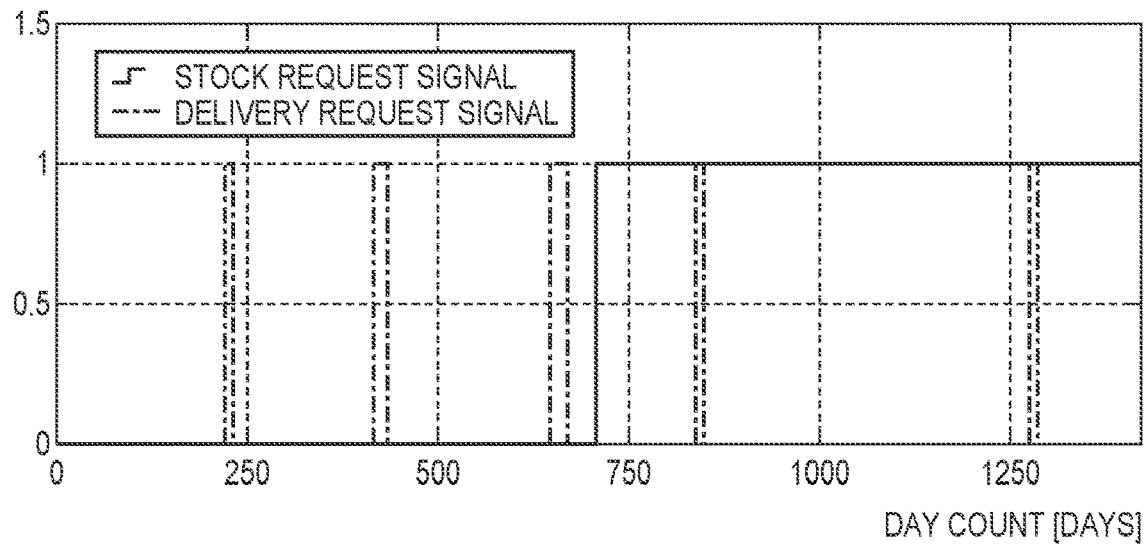

FIGS. 7A to 7C show an example of simulation noticeably indicating the effects of this embodiment. The abscissa in each of FIGS. 7A to 7C represents the number of operating days of the image forming apparatus 101. The ordinate in FIG. 7A represents "toner consumption amount [mg] per day". The solid-line plot in FIG. 7A represents the transition of the toner consumption amount per day by the user in this simulation. The chain line represents the count threshold [mg] used in step S201 described above. The accumulated average of toner consumption amounts per day by the user in the simulation is about 3,500 [mg]. In addition, the user consumes about 30,000 to 40,000 [mg] of toner about once per 100 days, and consumes 100,000 [mg] or more of toner about once per 400 days.

The ordinate in FIG. 7B represents the remaining day count D [days]. The sold-line plot in FIG. 7B represents the transition of the remaining day count D obtained by the prediction unit 305. The chain line represents a delivery threshold. An increase in the remaining day count D to about 200 after a decrease in the remaining day count D to about 0 indicates that the remaining day count D increases because of replacement of the used-up toner bottle with a new toner bottle.

The ordinate in FIG. 7C represents the signal value of a delivery request signal/stock request signal. Assume that in this embodiment, when a delivery request signal/stock request signal is output, the output delivery request signal/stock request signal has a value "1", whereas when no delivery request signal/stock request signal is output, the output delivery request signal/stock request signal has a value "0". The solid line represents the waveform of a stock request signal from the determination unit 308, and the chain line represents the waveform of a delivery request signal from the determination unit 306.

In this embodiment, upon detecting that the toner bottle in the image forming apparatus 101 is replaced with a new toner bottle, the determination unit 306 stops outputting (resets and cancels) the delivery request signal. That is, the determination unit 306 resets and cancels the delivery request signal in synchronism with an increase in remaining day count upon replacement with the new toner bottle in FIG. 7B. As shown in FIG. 7C, the delivery request signal is notified at the timing at which the remaining day count D in FIG. 7B becomes 10 or less, but the remaining day count increases to about 200 without decreasing to 10 or less near the 1050th day. This is because a large amount of toner is unexpectedly consumed at this point of time as shown in FIG. 7A. That is, because the toner consumption amount per day exceeds the remaining toner amount, the toner bottle is replaced before the remaining day count decreases to 10 or less in the progression of date. Accordingly, a delivery request signal cannot be notified sufficiently before such an unexpected consumption.

However, in this case, the second unexpected toner consumption has occurred near the 700th day, and a stock request signal is notified at this timing. If, therefore, a toner bottle is stoked at the installation place of the image forming apparatus at this point of time, the image forming apparatus does not stop because of the shortage of the consumable even if a delivery request signal is not notified in time because of the unexpected large toner consumption near the 1050th day. In this manner, the embodiment can reduce the chance of the stoppage of the image forming apparatus due to delay in the delivery of the consumable when an unexpected large toner consumption is repeated.

Note that a stock request signal is notified depending on how the image forming apparatus is used, and hence is preferably reset as the population of users who use the apparatus changes. For example, the determination unit 308 stops outputting (resets and cancels) the delivery request signal in response to an input operation from the consumable management screen displayed on the operation panel 171 or an operation input by the operator of the maintenance server 307. The contents of this operation and operation timing are not limited to any specific example.

Second Embodiment

The differences between the first embodiment and each of the following embodiments including the second embodiment will be described. The remaining portion of each embodiment described below is the same as that of the first embodiment unless otherwise specified. An example of the configuration of an image forming apparatus 101 according to the second embodiment associated with delivery management of consumables used for image formation by the image forming apparatus 101 will be described with reference to the block diagram of FIG. 8. This embodiment will also exemplify a case in which a consumable is toner.

A controller 350 according to this embodiment is obtained by omitting the prediction unit 305 from the controller 300 described above, and the operations of a consumption amount detection unit 302 and a determination unit 306 differ from those in the first embodiment.

The consumption amount detection unit 302 sends out a toner remaining amount $W_T$ to the determination unit 306. If the toner remaining amount $W_T$ is equal to or less than a predetermined delivery threshold (for example, 150,000 [mg]), the determination unit 306 determines that a toner bottle 140 will be used up soon, and generates a delivery request signal. The determination unit 306 then sends out the generated delivery request signal to a display controller 310, and also transmits the generated delivery request signal to a maintenance server 307 via a network. Note that the delivery threshold for toner remaining mounts is not limited to the absolute weight of toner, and may be a relative amount [%] with respect to the initial remaining amount of the loaded toner bottle.

Third Embodiment

Figure 9:
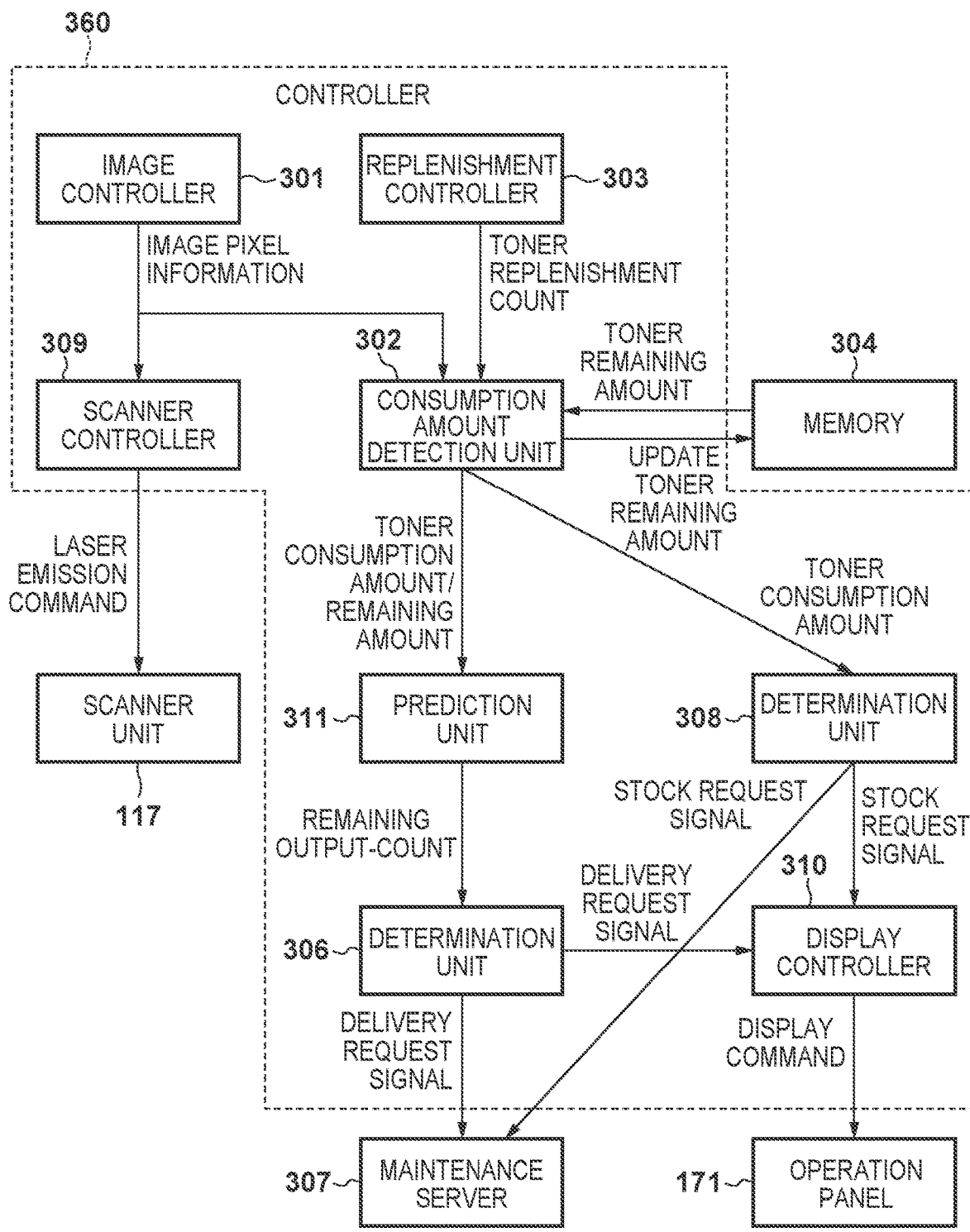
FIG. 9 is a block diagram showing an example of the configuration of an image forming apparatus 101 associated with consumable delivery management.

An example of the configuration of an image forming apparatus 101 according to the third embodiment associated with delivery management of consumables used for image formation by the image forming apparatus 101 will be described with reference to the block diagram of FIG. 9. This embodiment will also exemplify a case in which a consumable is toner.

A controller 360 according to this embodiment includes a prediction unit 311 in place of the prediction unit 305 in the controller 300 described above, and the operation of a determination unit 306 differs from that in the first embodiment. The prediction unit 311 calculates an average toner consumption amount M per sheet (per printing material S) by calculating the following equation from an accumulated toner consumption amount from a consumption amount detection unit 302 and an accumulated value of a print-out count acquired from a print job controller (not shown).

$$M = \frac{\sum_{n=1}^{i} U_i}{R} \text{ [mg/count]}$$

In this equation, R is the accumulated value of print-out counts after the installation of the image forming apparatus 101 and the number of A4-size sheets. For example, the prediction unit 311 counts up R by one per surface in printing using A4/LTR size paper, and counts up R by two in printing using A3/LGL size paper. The prediction unit 311 then obtains a count Z of sheets that can be printed out with the toner currently left in the image forming apparatus 101 by calculating the following equation using a toner remaining amount $W_T$ and an average toner consumption amount M.

$$Z[\text{count}]=W_T/M$$

The prediction unit 311 then sends out the obtained count Z to the determination unit 306. If the count Z is equal to or less than a predetermined delivery threshold (for example, 2,000 [count]), the determination unit 306 determines that a toner bottle 140 will be used up soon, and generates a delivery request signal for prompting "delivery request" as an example of a preparation request for a replacement toner bottle. The determination unit 306 then sends out the generated delivery request signal to a display controller 310, and also transmits the generated delivery request signal to a maintenance server 307 via a network.

Fourth Embodiment

All the functional units of the above controllers 300, 350, and 360 may be implemented by hardware or partly implemented by software. In the latter case, the software is stored in the memory in the controller 300 (350, 360) in advance, and the processor of the controller 300 (350, 360) executes the software to implement the function of the corresponding functional unit.

The above embodiment has exemplified the configuration that makes the controller 300 of the image forming apparatus implement each function. However, the embodiment may be configured to make the processor of the maintenance server 307 implement each function. For example, the embodiment has the following configuration. The maintenance server 307 acquires image data, and obtains image pixel information P from the image data. The maintenance server 307 acquires a toner replenishment count N in the image forming apparatus. The maintenance server 307 decides an estimated consumption amount based on the image pixel information P and the toner replenishment count N, and obtains an average value UAVE of accumulated toner consumption amounts. The maintenance server 307 obtains a remaining day count D as the usage period of the toner currently left in the image forming apparatus 101 by using the average value UAVE of accumulated toner consumption amounts and a toner remaining amount WT received from a consumption amount detection unit 302. If the remaining day count D is equal to or less than the delivery threshold, the maintenance server 307 outputs a delivery request signal to the display. In addition, the maintenance server 307 increments the threshold exceeding count by one if the accumulated toner consumption amount is equal to or more than a predetermined amount. Furthermore, if the threshold exceeding count is equal to or more than a predetermined stock determination threshold (for example, 2), the maintenance server 307 notifies the display of a stock request signal. In this configuration, the maintenance server 307 functioning as an information processing apparatus notifies a delivery request signal and a stock request signal.

Some or all of the respective embodiments described above may be combined as needed when used, or may be selectively used. In addition, various types of values used in the above description are exemplary, and are not limited to the numerical values described above.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-014119, filed Jan. 30, 2018, which is hereby incorporated by reference herein in its entirety.

What is claimed is:

1. An information processing apparatus communicating with an image forming apparatus on which toner containers containing toners of different colors are mounted and which forms an image using the toners of different colors, the information processing apparatus comprising:
    an acquisition unit configured to acquire, for each color, a stock request of a toner container to be stocked, the toner container to be stocked being different from the toner containers mounted on the image forming apparatus; and
    a display unit configured to display, for each color, stock information indicating that stocking of a spare toner container is required, in accordance with the stock request acquired by the acquisition unit.

2. The apparatus according to claim 1, wherein the acquisition unit acquires, for each color, a delivery request for requesting delivery of a toner container to be replaced with the toner container mounted on the image forming apparatus, and
    the display unit displays, for each color, delivery information indicating that the acquisition unit acquires the delivery request.

3. The apparatus according to claim 2, further comprising a determination unit configured to determine, in accordance with data related to a consumption amount of toner of each color consumed by the image forming apparatus, whether to output the delivery request.

4. The apparatus according to claim 2, wherein, in a case where the toner container, which is mounted to the image forming apparatus, of a color included in the different colors is replaced, the display unit changes display of delivery information of the color.

5. The apparatus according to claim 1, wherein the acquisition unit acquires, for each color, the number of toner containers to be stocked as a spare toner container; and
    the display unit displays, for each color, the number of toner containers to be stocked as a spare toner container.

6. The apparatus according to claim 5, further comprising a determination unit configured to determine, in accordance with data related to a consumption amount of toner of each color consumed by the image forming apparatus, the number of toner containers to be stocked as a spare toner container.

7. The apparatus according to claim 1, further comprising a determination unit configured to determine, in accordance with data related to a consumption amount of toner of each color consumed by the image forming apparatus, whether to output the stock request.

8. A control method of an information processing apparatus communicating with an image forming apparatus on which toner containers containing toners of different colors are mounted and which forms an image using the toners of different colors, the control method comprising:
    acquiring, for each color, a stock request of a toner container to be stocked, the toner container to be stocked being different from the toner containers mounted on the image forming apparatus; and
    displaying, for each color, stock information indicating that stocking of a spare toner container is required, in accordance with the stock request.

9. The method according to claim 8, further comprising acquiring, for each color, a delivery request for requesting delivery of a toner container to be replaced with the toner container mounted on the image forming apparatus, and
    displaying, for each color, delivery information indicating that the delivery request is acquired.

10. The method according to claim 9, further comprising controlling, in accordance with data related to a consumption amount of toner of each color consumed by the image forming apparatus, whether to output the delivery request.

11. The method according to claim 9, further comprising detecting that the toner container, which is mounted to the image forming apparatus, of a color included in the different colors is replaced; and
    changing display of deliver information of the color in a case where replacement of the toner container, which is mounted to the image forming apparatus, of the color included in the different colors is detected.

12. The method according to claim 8, further comprising acquiring data related to a consumption amount of toner of each color consumed by the image forming apparatus; and
    displaying for each color, in accordance with the data, the number of toner containers to be stocked as a spare toner container.

13. The method according to claim 12, further comprising determining, in accordance with data related to a consumption amount of toner of each color consumed by the image forming apparatus, the number of toner containers to be stocked as a spare toner container.

14. The method according to claim 8, further comprising controlling, in accordance with data related to a consumption amount of toner of each color consumed by the image forming apparatus, whether to output the stock request.

15. An information processing apparatus communicating with an image forming apparatus on which a toner container containing a toner is mounted and which forms an image using the toner, the information processing apparatus comprising:
    an acquisition unit configured to acquire a stock request of a toner container to be stocked, the toner container to be stocked being different from the toner containers mounted on the image forming apparatus, and acquire the number of toner containers to be stocked as a spare toner container; and
    a display unit configured to display stock information indicating that stocking of a spare toner container is required, in accordance with the stock request acquired by the acquisition unit, and display the number of toner containers to be stocked as a spare toner container acquired by the acquisition unit.

16. The apparatus according to claim 15, wherein the acquisition unit acquires a delivery request for requesting delivery of a toner container to be replaced with the toner container mounted on the image forming apparatus, and
the display unit displays delivery information indicating that the acquisition unit acquires the delivery request.

17. The apparatus according to claim 16, further comprising a determination unit configured to determine, in accordance with data related to a consumption amount of toner consumed by the image forming apparatus, whether to output the delivery request.

18. The apparatus according to claim 16, wherein, in a case where the toner container which is mounted to the image forming apparatus is replaced, the display unit changes display of the delivery information.

19. The apparatus according to claim 15, further comprising a determination unit configured to determine, in accordance with data related to consumption amount of toner consumed by the image forming apparatus, whether to output the stock request.

20. The apparatus according to claim 15, further comprising a determination unit configured to determine, in accordance with data related to a consumption amount of toner consumed by the image forming apparatus, the number of toner containers to be stocked as a spare toner container.

21. A control method of an information processing apparatus communicating with an image forming apparatus on which a toner container containing a toner is mounted and which forms an image using the toner, the control method comprising:
acquiring a stock request of a toner container to be stocked, the toner container to be stocked being different from the toner container mounted on the image forming apparatus;
determining the number of toner containers to be stocked as a spare toner container;
displaying stock information indicating that stocking of a spare toner container is required, in accordance with the stock request; and
displaying the number of toner containers to be stocked as a spare toner container.

22. The method according to claim 21, further comprising acquiring a delivery request for requesting delivery of a toner container to be replaced with the toner container mounted on the image forming apparatus, and
displaying deliver information indicating that the delivery request is acquired.

23. The method according to claim 22, further comprising determining, in accordance with data related to a consumption amount of toner consumed by the image forming apparatus, whether to output the delivery request.

24. The method according to claim 22, further comprising detecting that the toner container which is mounted to the image forming apparatus is replaced; and
changing display of deliver information in a case where replacement of the toner container which is mounted to the image forming apparatus is detected.

25. The method according to claim 21, further comprising determining, in accordance with data related to a consumption amount of toner consumed by the image forming apparatus, whether to output the stock request.

26. The method according to claim 21, further comprising determining, in accordance with data related to consumption amount of toner consumed by the image forming apparatus, the number of toner containers to be stocked as a spare toner container.

* * * * *